United States Patent
Shah et al.

(10) Patent No.: US 11,616,744 B2
(45) Date of Patent: Mar. 28, 2023

(54) CONTEXT-DEPENDENT MESSAGE EXTRACTION AND TRANSFORMATION

(71) Applicant: Intuit Inc., Mountain View, CA (US)

(72) Inventors: Shivang Bhadresh Shah, Newark, CA (US); Saharath Jay Jay Kleips, Sunnyvale, CA (US); Navjot Singh Cheema, Hayward, CA (US); Akbar Abdul Rangara, Austin, TX (US); Happy Bhairuprasad Somani, Fremont, CA (US); Jake Thomas Hilborn, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 48 days.

(21) Appl. No.: 17/388,784

(22) Filed: Jul. 29, 2021

(65) Prior Publication Data
US 2023/0032190 A1 Feb. 2, 2023

(51) Int. Cl.
*H04L 51/046* (2022.01)
*H04L 51/214* (2022.01)
*H04L 51/216* (2022.01)

(52) U.S. Cl.
CPC .......... *H04L 51/046* (2013.01); *H04L 51/214* (2022.05); *H04L 51/216* (2022.05)

(58) Field of Classification Search
CPC .... H04L 51/046; H04L 51/216; H04L 51/214
See application file for complete search history.

(56) References Cited

U.S. PATENT DOCUMENTS

| | | | |
|---|---|---|---|
| 7,120,597 B1 | 10/2006 | Knudtzon et al. | |
| 7,140,035 B1 | 11/2006 | Karch | |
| 7,240,028 B1 | 7/2007 | Rugge | |
| 7,542,973 B2 | 6/2009 | Segal et al. | |
| 7,925,551 B2 | 4/2011 | Hahn-Carlson et al. | |
| 8,589,268 B2 | 11/2013 | Hahn-Carlson | |
| 8,751,337 B2 | 6/2014 | Hahn-Carlson | |
| 10,091,155 B1 * | 10/2018 | Ledet | H04L 51/226 |
| 10,528,367 B1 | 1/2020 | Liu et al. | |
| 10,608,977 B1 * | 3/2020 | Ledet | H04L 47/2483 |
| 10,698,733 B1 | 6/2020 | Lee et al. | |
| 10,884,909 B1 | 1/2021 | Chatterjee | |
| 11,138,372 B2 | 10/2021 | Guzman et al. | |
| 11,315,119 B1 | 4/2022 | Hendry et al. | |
| 2003/0191710 A1 | 10/2003 | Green et al. | |
| 2003/0212617 A1 | 11/2003 | Stone et al. | |
| 2004/0049459 A1 | 3/2004 | Philliou et al. | |
| 2004/0138937 A1 | 7/2004 | Hahn-Carlson | |

(Continued)

OTHER PUBLICATIONS

Shah et al., "Context-Dependent Event Cleaning and Publication," U.S. Appl. No. 17/388,826, filed Jul. 29, 2021.

(Continued)

*Primary Examiner* — Sargon N Nano
(74) *Attorney, Agent, or Firm* — Paradice and Li LLP

(57) ABSTRACT

Systems and methods for parsing and publishing messages corresponding to changes in a database are disclosed. An example method includes receiving a first plurality of messages from the database, parsing the messages in the first plurality of messages into at least a first group and a second group of messages, each message in a group sharing a common identifier, and forwarding the first group of messages and the second group of messages to an event streaming platform.

16 Claims, 8 Drawing Sheets

(56) References Cited

U.S. PATENT DOCUMENTS

| | | |
|---|---|---|
| 2005/0075960 A1 | 4/2005 | Leavitt et al. |
| 2005/0078660 A1* | 4/2005 | Wood .................... H04M 17/00 |
| | | 370/352 |
| 2005/0240531 A1 | 10/2005 | Wolff |
| 2005/0289237 A1* | 12/2005 | Matsubara .......... H04L 67/1063 |
| | | 709/232 |
| 2007/0013968 A1 | 1/2007 | Ebaugh et al. |
| 2007/0271160 A1 | 11/2007 | Stone et al. |
| 2008/0091577 A1 | 4/2008 | Holmes et al. |
| 2008/0208780 A1 | 8/2008 | Hoopes et al. |
| 2009/0076951 A1 | 3/2009 | Szamel |
| 2010/0161362 A1 | 6/2010 | Shapira et al. |
| 2010/0189230 A1* | 7/2010 | Jackson ............ H04M 3/53316 |
| | | 379/88.22 |
| 2011/0161215 A1 | 6/2011 | Reed et al. |
| 2012/0331486 A1 | 12/2012 | Bhattacharyya et al. |
| 2013/0034216 A1* | 2/2013 | Jackson ............ H04M 3/53316 |
| | | 379/88.22 |
| 2013/0318189 A1 | 11/2013 | Klein et al. |
| 2015/0161722 A1* | 6/2015 | Harp ................... G06F 16/2358 |
| | | 705/35 |
| 2015/0324872 A1 | 11/2015 | Daswani et al. |
| 2017/0039553 A1 | 2/2017 | Ghatage |
| 2017/0103455 A1 | 4/2017 | Schroeder et al. |
| 2018/0260467 A1 | 9/2018 | Stewart et al. |
| 2021/0157809 A1 | 5/2021 | Mor et al. |

OTHER PUBLICATIONS

Shah et al., "Multiple Source Audit Log Generation," U.S. Appl. No. 17/388,862, filed Jul. 29, 2021.

* cited by examiner

CONTEXT-DEPENDENT MESSAGE EXTRACTION AND TRANSFORMATION

TECHNICAL FIELD

This disclosure relates generally to processing of messages from a database, and more particularly to extracting, transforming, and loading such messages to an event streaming platform.

DESCRIPTION OF RELATED ART

Many companies and other entities store an enormous amount of valuable data in databases. While such data is valuable, the architectures of such databases may prevent their full value from being realized, for example, due to legacy databases' failure to sufficiently support data cleansing, organization, extraction of historical data, and real time streaming of cleansed data. This may significantly impact the value and ease of use of this data by downstream consumers. For example, a company may desire to leverage this stored data for use with artificial intelligence (AI) or machine learning (ML) applications to improve search functionality, to improve near real time data analytics, and so on. However, without being able to extract, cleanse, and stream such data, these downstream uses may not be possible, or may be unacceptably difficult. As such, there is a need for a system that can not only cleanse and stream data extracted from conventional databases but also forward messages associated with data changes in the database to downstream systems in a manner that ensures all messages relating to a particular event or transaction are received by the downstream systems concurrently.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method of parsing and publishing messages from a database. The method may be performed by a computing device including or associated with the database and may include receiving a plurality of messages from the database, each of the messages including an identifier and corresponding to one or more changes in the database. The method may also include parsing the plurality of messages into at least a first group of messages and a second group of messages based on the identifiers in the messages, each message in a respective group of messages sharing a common identifier. The method may also include assigning an event type to each message of the first group of messages and to each message of the second group of messages. The method may also include forwarding the first group of messages and the second group of messages to an event streaming platform. In various implementations, each message in the first group of messages indicates a change in one or more tables of the database. In some aspects, the event type is one of a create event type, an update event type, or a deletion event type.

In some implementations, the common identifier may be an account number. In some implementations, the common identifier may be a unique identifier. In some aspects, the first group and the second group of messages each include messages corresponding to a respective common event or transaction. In some other aspects, the first group and the second group of messages each include messages corresponding to a respective common entity. In one implementation, the method may also include requesting, from the database, historical messages corresponding to previous changes in the one or more tables of the database and receiving the historical messages in response to the request.

In some implementations, assigning the event type may include identifying, in the first group of messages, one or more messages corresponding to a change in a primary table of the database, determining that the change in the primary table of the database corresponds to a create event type, an update event type, or a deletion event type, and assigning the event type of the first group of messages based on the determined change in the primary table. In other implementations, assigning the event type may include determining that no messages in the first group of messages corresponds to a change in a primary table of the database, and setting the event type of the first group of messages to an update event type.

Another innovative aspect of the subject matter described in this disclosure can be implemented in a computing system coupled to at least one database and an event streaming platform. An example system includes one or more processors, and a memory storing instructions for execution by the one or more processors. Execution of the instructions causes the system to receive a plurality of messages from the database, each of the messages including an identifier and corresponding to one or more changes in the database. Execution of the instructions causes the system to parse the plurality of messages into at least a first group of messages and a second group of messages based on the identifiers in the messages, each message in a respective group of messages sharing a common identifier. Execution of the instructions causes the system to assign an event type to each message of the first group of messages and to each message of the second group of messages. Execution of the instructions causes the system to forward the first group of messages and the second group of messages to an event streaming platform. In various implementations, each message in the first group of messages indicates a change in one or more tables of the database. In some aspects, the event type is one of a create event type, an update event type, or a deletion event type.

In some implementations, the common identifier may be an account number. In some implementations, the common identifier may be a unique identifier. In some aspects, the first group and the second group of messages each include messages corresponding to a respective common event or transaction. In some other aspects, the first group and the second group of messages each include messages corresponding to a respective common entity. In one implementation, execution of the instructions also causes the system to request, from the database, historical messages corresponding to previous changes in the one or more tables of the database, and to receive the historical messages in response to the request.

In some implementations, assigning the event type may include identifying, in the first group of messages, one or more messages corresponding to a change in a primary table of the database, determining that the change in the primary table of the database corresponds to a create event type, an update event type, or a deletion event type, and assigning the event type of the first group of messages based on the determined change in the primary table. In other implementations, assigning the event type may include determining that no messages in the first group of messages corresponds to a change in a primary table of the database, and setting the event type of the first group of messages to an update event type.

Another innovative aspect of the subject matter described in this disclosure can be implemented in a non-transitory computer-readable storage medium of a system including or coupled to a database. The non-transitory computer-readable storage medium stores instructions that, when executed by one or more processors of the system, causes the system to perform a number of operations. In some implementations, the operations include receiving a plurality of messages from the database, each of the messages including an identifier and corresponding to one or more changes in the database. The operations also include parsing the plurality of messages into at least a first group of messages and a second group of messages based on the identifiers in the messages, each message in a respective group of messages sharing a common identifier. The operations also include assigning an event type to each message of the first group of messages and to each message of the second group of messages. The operations also include forwarding the first group of messages and the second group of messages to an event streaming platform. In various implementations, each message in the first group of messages indicates a change in one or more tables of the database. In some aspects, the event type is one of a create event type, an update event type, or a deletion event type.

In some implementations, the common identifier may be an account number. In some implementations, the common identifier may be a unique identifier. In some aspects, the first group and the second group of messages each include messages corresponding to a respective common event or transaction. In some other aspects, the first group and the second group of messages each include messages corresponding to a respective common entity. In one implementation, the operations may also include requesting, from the database, historical messages corresponding to previous changes in the one or more tables of the database and receiving the historical messages in response to the request.

In some implementations, assigning the event type may include identifying, in the first group of messages, one or more messages corresponding to a change in a primary table of the database, determining that the change in the primary table of the database corresponds to a create event type, an update event type, or a deletion event type, and assigning the event type of the first group of messages based on the determined change in the primary table. In other implementations, assigning the event type may include determining that no messages in the first group of messages corresponds to a change in a primary table of the database, and setting the event type of the first group of messages to an update event type.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
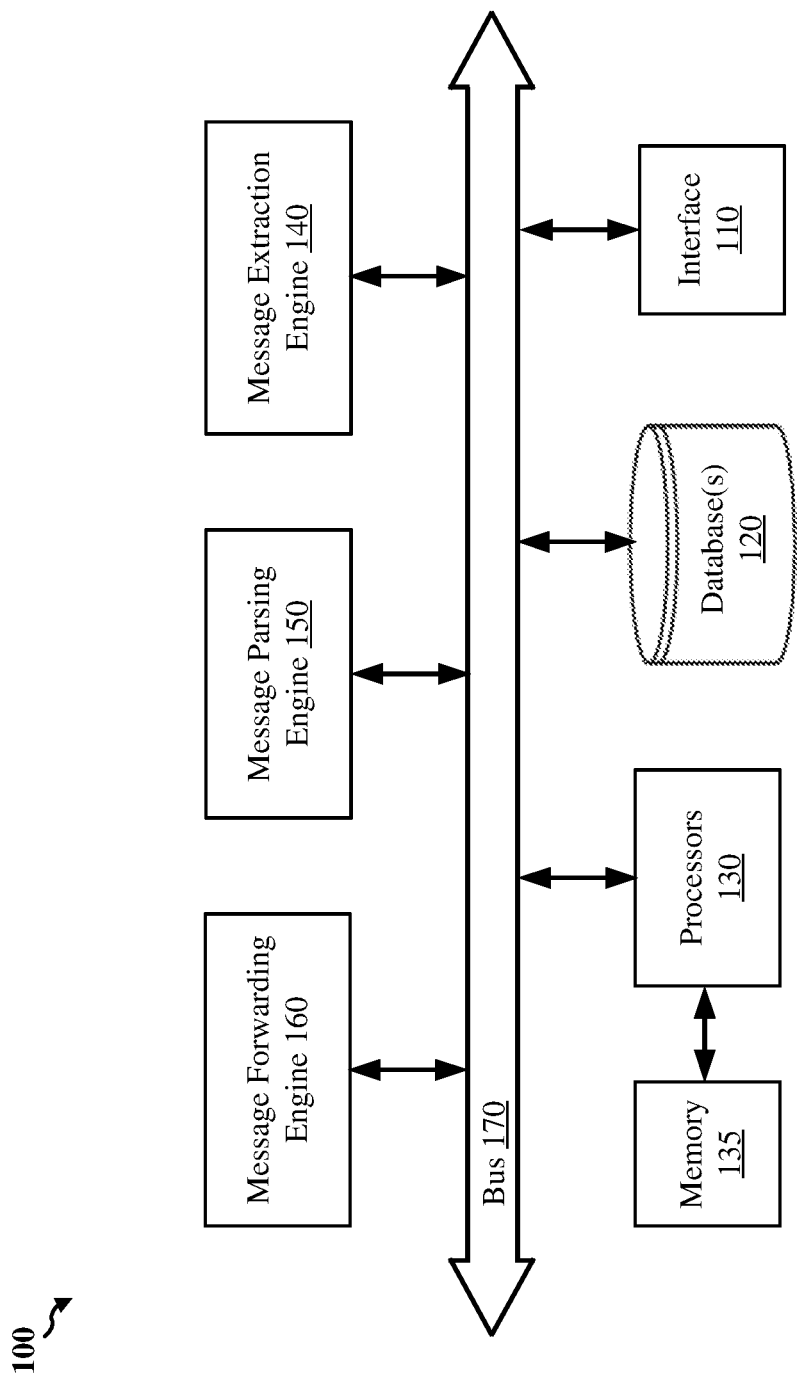
FIG. 1 shows a message parsing and forwarding system, according to some implementations.

Implementations of the subject matter described in this disclosure may be used to receive messages corresponding to changes in a plurality of tables in a database, organize these messages into groups corresponding to events or transactions, and forward these groups of messages to one or more downstream systems, such as one or more event streaming platforms. Grouping such messages may be based on the presence of a common identifier in each message in a group, indicating that each message in the group relates to a common event or transaction. Such grouping may ensure that all messages relating to the event or transaction are forwarded together, avoiding the risk of providing incomplete or inaccurate system states to downstream consumers of the messages. These and other aspects of the example implementations are discussed further below.

Various implementations of the subject matter disclosed herein provide one or more technical solutions to the technical problem of efficiently and accurately processing changes to tables in a database for provision to downstream systems and users. Example implementations may parse messages in a first plurality of messages received from a database into at least a first group and a second group of messages, where each message in a group shares a common identifier. Further, example implementations may forward the first group and the second group of messages to an event streaming platform. For example, the first group and the second group of messages may each include messages corresponding to a common respective transaction or business entity. The common identifier may identify a business entity, a transaction, an event, or another suitable event. Example implementations may also send a request to the database for messages corresponding to previous tables of the database and receive the first plurality of messages in response to the sent request. More specifically, various aspects of the present disclosure provide a unique computing solution to a unique computing problem that did not exist prior to electronic event streaming systems which process changes from one or more databases, such as one or more legacy databases. As such, implementations of the subject matter disclosed herein are not an abstract idea such as organizing human activity or a mental process that can be performed in the human mind.

Moreover, various aspects of the present disclosure effect an improvement in the technical field of efficiently and accurately processing changes to tables in a database for provision to downstream systems and users. Parsing received messages into groups based on each message in a group sharing a common identifier, assigning an event type to each group, and forwarding each group to an event streaming platform may allow for more accurate information to be provided to downstream users. Further, aspects of the present disclosure may enable such parsing, assigning, and forwarding to be performed more efficiently and using fewer processing resources as compared to conventional techniques. Receiving messages from a database, parsing the received messages into groups, assigning an event type to each group, and forwarding the groups of messages to the event streaming platform cannot be performed in the human mind, much less using pen and paper. In addition, implementations of the subject matter disclosed herein are usable with a wide variety of computing applications, and do far more than merely create contractual relationships, hedge risks, mitigate settlement risks, and the like, and therefore cannot be considered a fundamental economic practice.

As discussed, many companies and other entities store an enormous amount of valuable data in databases. While such data is valuable, the architectures of such databases may prevent their full value from being realized, for example, due to legacy databases' failure to sufficiently support data cleansing, organization, extraction of historical data, and real time streaming of cleansed data. This may significantly impact the value and ease of use of this data by downstream consumers. For example, a company may desire to leverage this stored data for use with artificial intelligence (AI) or machine learning (ML) applications, for improving search functionality, for improving near real time data analytics, and so on. However, without being able to extract, cleanse, and stream such data, these downstream uses may not be possible, or may be unacceptably difficult.

When data extracted from one or more databases is streamed in real or near-real time, accurate use of the streamed data requires ensuring that downstream data consumers receive data corresponding to an accurate state of the databases. For example, a single event or transaction may result in changes in multiple tables in a database. Consider a simple example when inventory of a company moves from a warehouse to a store, a first message indicates a reduction in a table indicating the warehouse's inventory, while a second message indicates an increase in the store's inventory. If a downstream consumer of the data has received the first message but not the second, the consumer may make inferences, generate search results, and so on based on an inaccurate state of the company's inventory. Other common events and transactions may result in more complicated sets of changes, underlining the need for downstream data users to have an accurate state of the one or more databases.

Conventional solutions may leverage parallel processing techniques to generate different threads for messages of different types; however, such techniques are difficult to extend, due to their configuration depending on the specific database message format and contents. Further, at the scale required for many databases, the computational complexity of such parallel processing techniques may be prohibitively computationally expensive.

Accordingly, aspects of the present disclosure provide methods and apparatus for extracting messages stored in one or more databases, such as messages representing changes in tables of one or more legacy databases. Such messages may be received in real time or near-real time from the one or more databases or may include messages representing historical changes in the one or more databases. Further, such extracted messages may be parsed into groups of messages, based on context, such as each message of a group including a common identifier. The groups of messages may be assigned a change type, and then forwarded for streaming, such as by forwarding the groups of messages to an event streaming platform. This grouping may ensure that all messages pertaining to a specific event, transaction, occurrence, etc., are streamed together, so that downstream users of the streamed data have data representing an accurate state of the one or more databases.

FIG. 1 shows a message parsing and forwarding system 100, according to some implementations. Various aspects of the message parsing and forwarding system 100 disclosed herein may be applicable for processing changes in tables in a database for provision to downstream systems and users in a variety of computing applications. Such functionality may be useful for enabling a wide variety of downstream uses of data stored in a database, such as enabling search functions, data aggregation functions, data analytics, inference functions such as machine learning and neural network based inference functions, and so on.

The message parsing and forwarding system 100 is shown to include an input/output (I/O) interface 110, a database 120, one or more data processors 130, a memory 135 coupled to the data processors 130, a message extraction engine 140, a message parsing engine 150, and a message forwarding engine 160. In some implementations, the various components of the message parsing and forwarding system 100 may be interconnected by at least a data bus 170, as depicted in the example of FIG. 1. In other implementations, the various components of the message parsing and forwarding system 100 may be interconnected using other suitable signal routing resources.

The interface 110 may include a screen, an input device, and other suitable elements that allow a user to provide information to the message parsing and forwarding system 100 and/or to retrieve information from the message parsing and forwarding system 100. Example information that can be provided to the message parsing and forwarding system 100 may include configuration information for the message parsing and forwarding system 100, such as information for configuring the message extraction engine 140, the message parsing engine 150, or the message forwarding engine 160. For example, information for configuring the message extraction engine 140 may identify one or more databases from which messages are to be extracted, information for requesting historical messages from the one or more databases, message formatting information for the one or more databases, and so on. Configuration information for the message parsing engine 150 may include information for parsing extracted messages into groups, such as one or more common identifiers present in each message of a group. Configuration information for the message forwarding engine 160 may include information identifying where groups of parsed messages should be forwarded, such as one or more event streaming platforms, one or more databases, and so on. Example information that can be retrieved from the message parsing and forwarding system 100 may include parsed groups of messages extracted from the one or more databases, configuration information for the message parsing and forwarding system 100, and the like.

The database 120, which may represent any suitable number of databases, may store any suitable information pertaining to configuration of the message parsing and forwarding system 100, may include or identify one or more databases including messages to be extracted and parsed by the message parsing and forwarding system 100, may include information pertaining to users of the message parsing and forwarding system 100, and so on. For example, the information pertaining to configuration may identify one or more databases from which messages are to be extracted, information for requesting historical messages from the one or more databases, message formatting information for the one or more databases, may include information for parsing extracted messages into groups, such as one or more common identifiers present in each message of a group, may include information identifying where groups of parsed messages should be forwarded, such as one or more event streaming platforms, one or more databases, and so on. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120. In some aspects, the database 120 may be a QuickBooks Online (QBO) database, from Intuit, Inc.

The data processors 130, which may be used for general data processing operations (such as manipulating the data sets stored in the database 120), may be one or more suitable processors capable of executing scripts or instructions of one or more software programs stored in the message parsing and forwarding system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The message extraction engine 140 may extract messages from one or more databases included in or coupled to the message parsing and forwarding system 100, for example via the bus 170 or via one or more network interfaces. For example, the extracted messages may include a plurality of messages representing real time or recent changes to the one or more databases or may include a plurality of messages representing historical changes to the one or more databases. As discussed in more detail below, the message extraction engine 140 may receive the messages representing real time or recent changes from the one or more databases shortly after the changes occur or may receive the messages representing historical changes from the one or more databases in response to a request from the message extraction engine 140.

The message parsing engine 150 may be used to parse extracted messages into groups, based on one or more common identifiers in the extracted messages. As discussed further below, the message parsing engine 150 may parse the extracted messages into groups of related messages based on the common identifiers such that, for example, each group of messages may pertain to a common transaction, a common business entity, a common project, and so on. The message parsing engine 150 may also assign a change type to each group of messages. In some aspects, the change type may include a creation change type, an update change type, or a deletion change type. In some other aspects, additional change types may be assigned. The change type may be assigned based on the types of changes pertaining to the messages in the group and on whether the changes in the messages of the group include changes to a primary table or a secondary table.

The message forwarding engine 160 may forward the parsed groups of messages to one or more other downstream systems or platforms such as, for example, one or more event streaming platforms. In some instances, the groups of messages may be forwarded in real time to the downstream systems or platforms. In other instances, the groups of messages may be periodically forwarded to the downstream systems or platforms. In some other instances, the groups of messages may be forwarded to the downstream systems or platforms based on some other suitable basis or schedule.

The particular architecture of the message parsing and forwarding system 100 shown in FIG. 1 is but one example of a variety of different architectures within which aspects of the present disclosure may be implemented. For example, in other implementations, the message parsing and forwarding system 100 may not include the message extraction engine 140, the functions of which may be implemented by the processors 130 executing corresponding instructions or scripts stored in the memory 135. In some other implementations, the functions of the message parsing engine 150 may be performed by the processors 130 executing corresponding instructions or scripts stored in the memory 135. Similarly, the functions of the message forwarding engine 160 may be performed by the processors 130 executing corresponding instructions or scripts stored in the memory 135.

Figure 2:
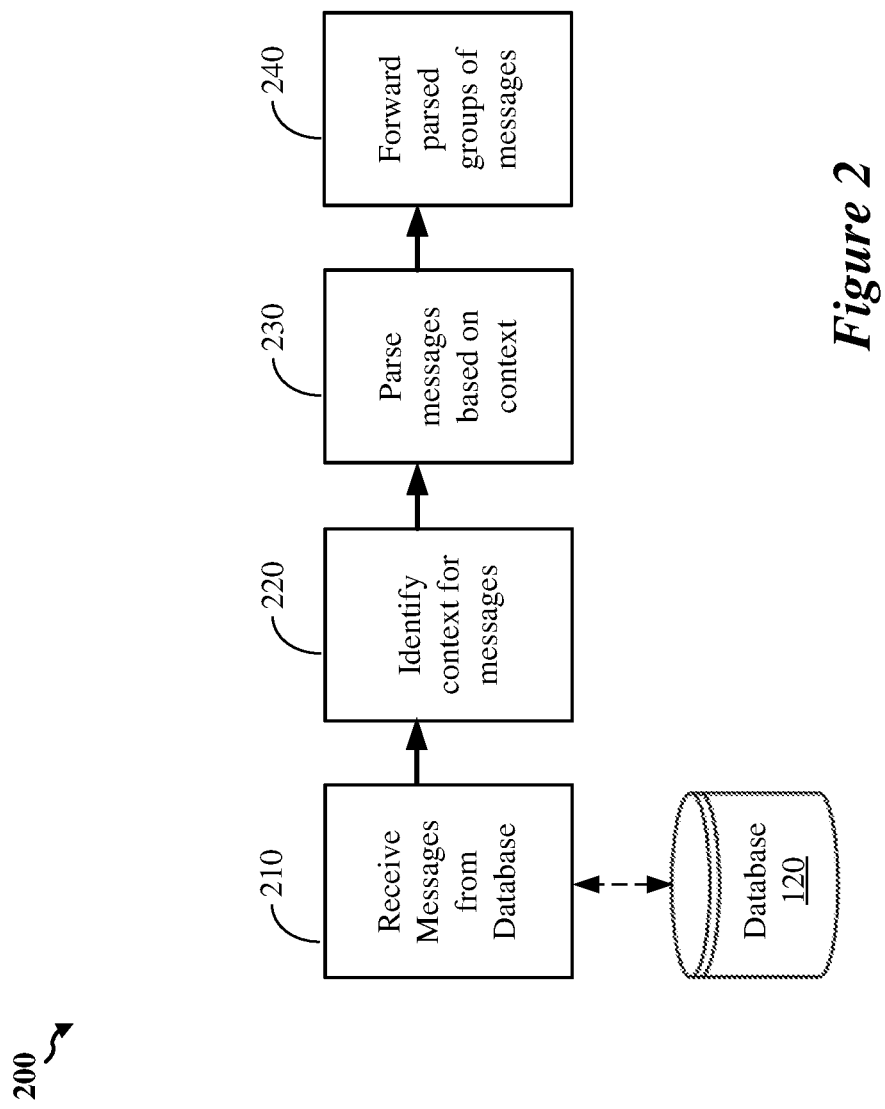
FIG. 2 shows a high-level overview of an example process flow that may be employed by the message parsing and forwarding system of FIG. 1.

FIG. 2 shows a high-level overview of an example process flow 200 that may be employed by the message parsing and forwarding system 100 of FIG. 1. In block 210, the message parsing and forwarding system 100 receives a plurality of messages from one or more databases, for example the messages may be received using the message extraction engine 140 via the interface 110 or retrieved from the database 120 or another database coupled to the message parsing and forwarding system 100. The messages may represent recent or real time changes in one or more tables of the database or may represent historical changes in one or more tables of the database. In block 220, the message parsing and forwarding system 100 identifies a context for each received message. For example, the message parsing engine 150 may identify the context of each received message using configuration data retrieved from the database 120 or received via one or more network interfaces coupled to the message parsing and forwarding system 100. In some examples, the context may be identified based on one or more identifiers in each received message. In block 230, the received messages are parsed based on their identified context. For example, the message parsing engine 150 may parse the received messages into groups based on the identified context of the messages. In some examples, each message in a group may include a common identifier, such as an identifier indicating a common transaction for each message in the group, a common business entity associated with each message in the group, a common purpose associated with each message in the group, and so on. Parsing the messages may also include assigning an event type, or a change type, to each group of messages based on whether or not any of the messages in a group reflects a change in a primary table. In block 240, the parsed groups of messages may be forwarded to one or more systems or platforms. For example, the message forwarding engine 160 may forward the parsed groups of messages to an event streaming platform.

Figure 3:
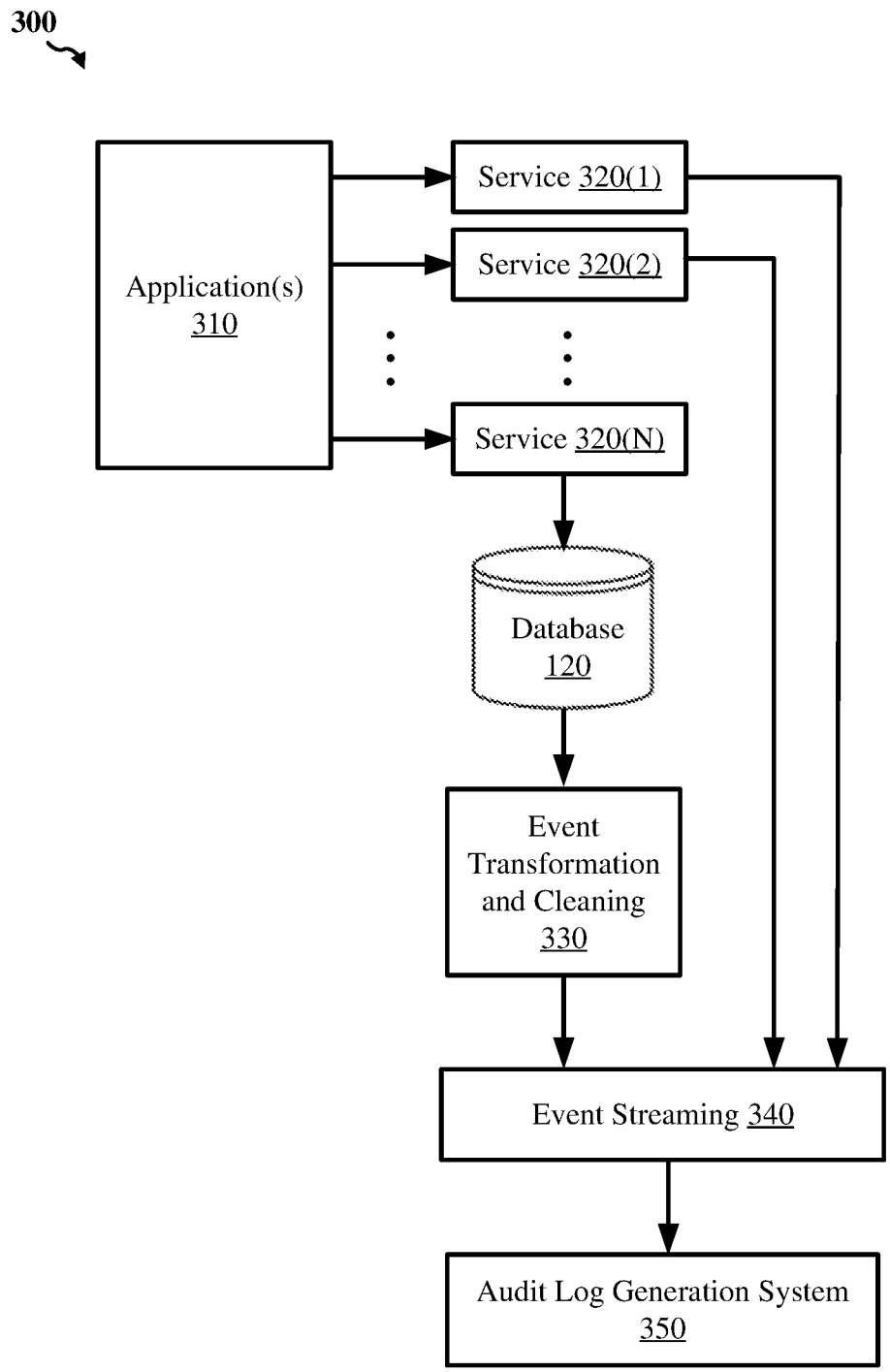
FIG. 3 shows a block diagram of an audit log generation system, according to some implementations.

FIG. 3 shows a block diagram of an audit log generation system 300, according to some implementations. One or more applications 310 may be coupled to a plurality 320 (1)-320(N) of services (collectively referred to as services 320). Each of the services 320 may be a data source, such as a microservice, an application service, a database, and so on. Each of the services 320 may perform operations using data from the applications 310. For example, the services 320 may obtain data from the applications 310 via one or more application user interfaces (not shown for simplicity). The services 320 may generate a plurality of messages each message corresponding to one or more of the performed operations. For some services, the generated messages may be provided to a database 120. The messages provided to the database 120 may then optionally be extracted by event transformation and cleaning 330.

The event transformation and cleaning 330 may perform one or more message extraction and cleansing operations on the extracted messages. The messages provided by the services 320 and the event transformation and cleaning 330 may then be published to the event streaming platform 340. The event streaming platform 340 may be any suitable event streaming platform, such as Apache Kafka. In some other aspects, messages generated by one or more of the services 320 may be provided directly to the event streaming platform 340. Note that while FIG. 3 shows the services 320 providing the messages to the event streaming platform 340, that in some other aspects, the event streaming platform 340 may be omitted. The messages generated by the services 320, and optionally the groups of messages from the event transformation and cleaning 330, may then be provided to the audit log generation system 350.

The audit log generation system 350 generates entries in an audit log corresponding to groups of one or more received messages, based on a determination that each message in a group corresponds to a common event or transaction. In some implementations, the audit log generation system 350 may be one example of the audit log generation system 100 of FIG. 1. Entries in the audit log generation system 350 are thereby generated to include information from relevant messages from the services 320.

Figure 4:
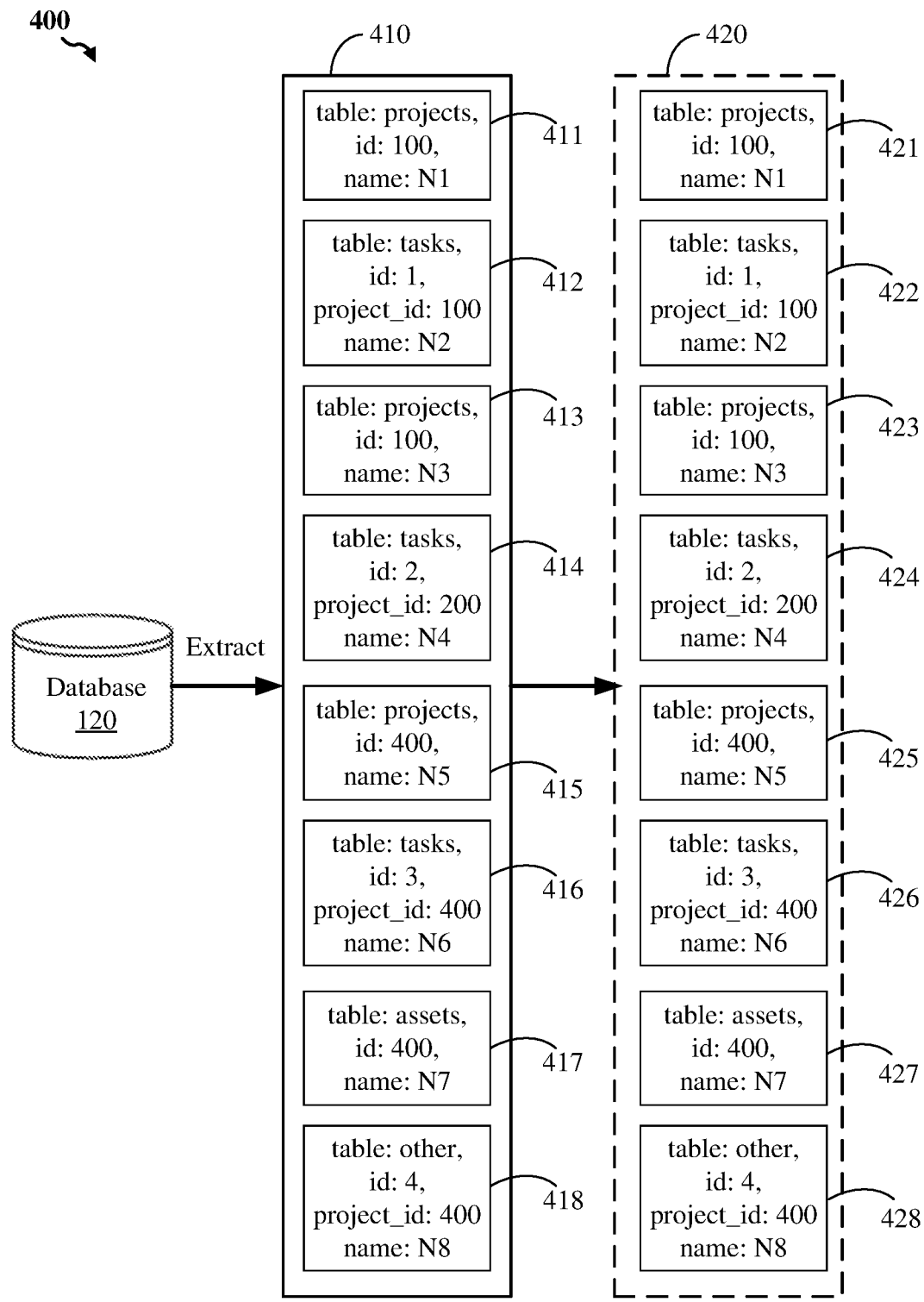
FIG. 4 shows an example message extraction from a database according to some implementations.

FIG. 4 shows an example message extraction 400 from a database. A plurality of messages 410 may be extracted from a database 120. For example, the plurality of messages 410 may be extracted from the database via a platform such as Oracle GoldenGate. The plurality of messages 410 may include messages 411, 412, 413, 414, 415, 416, 417, and 418. Note that while the plurality of messages 410 is shown to include eight messages for simplicity, that in practice pluralities of extracted messages may include substantially larger numbers of messages. The plurality of messages 410 may include messages corresponding to a particular database commit, changes to the database since a previous extraction of messages, or similar. Each message corresponds to a change in a table of the database. For example, message 411 identifies a table "projects" which has changed, an identifier 100 associated with the entry which has changed, and a name N1 of the changed entry. Note that the message 411 may also include a value for the changed entry, and a change type for the changed entry, in addition to other information associated with the changed entry, but such information has been omitted from FIG. 4 for simplicity. Similarly, other messages include similar contents. For example, message 412 identifies a table "tasks" which has changed, an associated id 1, a project id 100, and a name N2. While FIG. 4 shows the tables named "projects," "tasks," "assets," and "other," tables may have any suitable names, referring to whichever transactions, accounts, entities, assets, or other information are relevant to the database contents.

When providing the plurality of messages 410 to one or more downstream data consumers, such as via one or more event streaming platforms, it may not be desirable to forward the entire plurality of messages 410 due to the bandwidth and processing resources required for processing and forwarding relatively large messages. Conversely, as discussed above, individually forwarding the messages may result in downstream data consumers having an inaccurate database state, depending on the timing of reception of the messages. As such, individually forwarding the messages 421-428 corresponding to the extracted messages 411-418, respectively, is also undesirable.

It would therefore be desirable to forward the extracted messages to downstream data consumers without using relatively high transmission bandwidths and without requiring a relatively large amount of processing resources while also ensuring that the downstream data reflects accurate states of the database. Aspects of the example implementations may enable messages extracted from a database to be parsed into relevant groups in order to avoid the resource expenditure required for forwarding large groups of messages, and also to ensure downstream data consumers are able to determine accurate states of the database. More specifically, messages may be parsed into groups based on each message in a group containing a common identifier. Such an identifier may be any suitable identifier, such as an account identifier, a company identifier, a business entity identifier, a project identifier (as in FIG. 5), and so on. In some aspects, the common identifier may be a unique identifier identifying a company or another entity. As such, messages having a common identifier may be grouped together to ensure that all changes pertaining to that identifier are provided at the same or similar time to downstream entities.

For example, when the common identifier identifies an account or a company, such grouping may ensure that downstream data consumers receive all changes pertaining to that account or company at the same time, ensuring that downstream data consumers do not make inferences or take other actions based on an inaccurate database state. More particularly, as described above with regard to the simple example of a company's inventory moving from a warehouse to a store, this grouping may ensure that the first message indicating the reduction the warehouse's inventory is forwarded together with the second message indicating the increase in the store's inventory, ensuring that downstream data consumers maintain an accurate state of the company's inventory.

Figure 5:
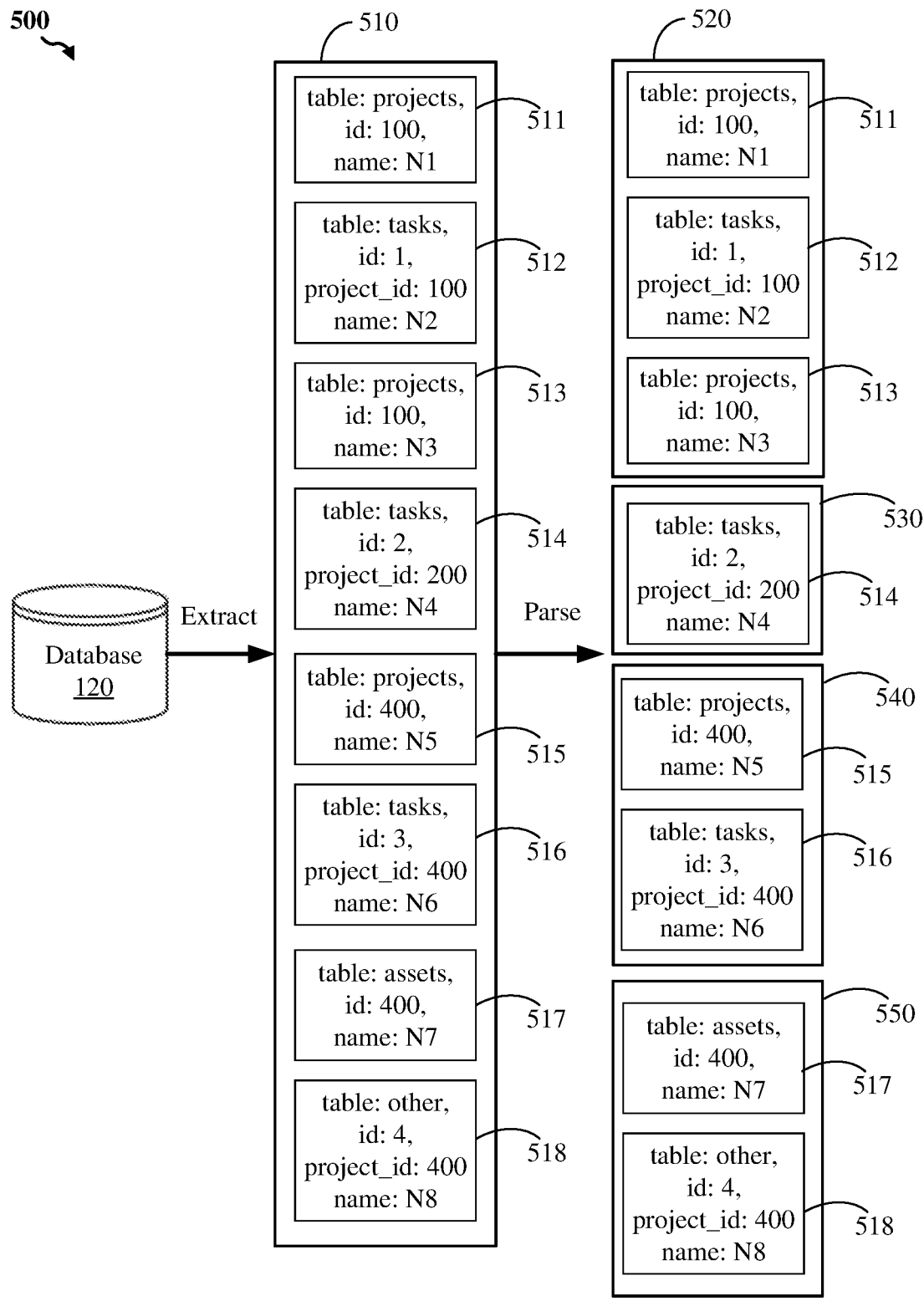
FIG. 5 shows an example message processing, according to some implementations.

FIG. 5 shows an example message processing 500, according to some implementations. The message processing 500 may be performed by any suitable system or apparatus, such as the message parsing and forwarding system 100 of FIG. 1. A plurality of messages 510 may be extracted from a database 120, or from another database in or coupled to the message parsing and forwarding system 100. In some examples, the database from which the first plurality of messages 510 is extracted may be a relational database, such as a structured query language (SQL) database, and may in one example be a QuickBooks Online database provided by Intuit, Inc. In some aspects, the messages 510 may be extracted from the database via a platform such as Oracle GoldenGate. As shown in FIG. 5, the messages 510 may be the same as the messages 410 of FIG. 4. However, rather than forwarding all of the messages 510 to a downstream entity at the same time or individually forwarding the messages 510 to the downstream entity, the message processing 500 is configured to parse the messages 510 into groups of messages, for example, such that each message in a respective group shares a common identifier. Specifically, messages 511 and 513 reflect changes in the projects table having an identifier of 100, and message 512 reflects a change in the tasks table which has an identifier of 1 and a project id of 100. This project id of 100 may indicate that the change in message 512 is associated with messages 511 and 513, as each shares the common identifier of 100. Note that the identifiers shown in FIG. 5 are merely illustrative, and that in practice, such common identifiers may have considerably longer numeric or alphanumeric values. Because each of the messages 511, 512, and 513 share the same identifier, they may be grouped for forwarding to the event streaming platform as first group 520. Similarly, a second group 530 may be formed including message 514 including the identifier of 200, a third group 540 may be formed from messages 515 and 516 including the identifier of 300, and a fourth group 550 may be formed from messages 517 and 518 including the identifier of 500. Rather than forwarding all of the messages 510 at the same time or forwarding each message 511-518 individually to the event streaming platform, the four groups of messages 520, 530, 540, and 550 may be forwarded, thus ensuring that all changes pertaining to each identifier are forwarded together.

While parallel processing related threading techniques may be used for generating small numbers of custom groups of messages from the extracted messages, such techniques are not scalable, and are highly computationally costly, in addition to requiring custom configuration for each type of thread to be generated. In contrast to such techniques, example implementations may allow for the specification of one or more message components indicating where the common identifier may be found for extracted messages. For example, in the messages of FIG. 5, for messages reflecting changes to the projects table, the common identifier is found in the "id" field, while for the "tasks," "assets," and "other" tables, the common identifier is found in the "project_id" field. Specifying the location of the common identifier in each message allows for the parsing of messages into groups, as shown in FIG. 5, without requiring complicated configuration of threading or the use of parallel processing techniques.

In addition to grouping related messages, parsing the messages may include assigning a change type, which may also be called an event type, to each group of messages. For example, such change types may include an entry creation (or insertion) type, an entry update type, and an entry deletion type. Each message in a group may also be associated with one of these change types. In some aspects, each table of the database may be a primary table or a secondary table. In some aspects, one or more tables associated with a particular identifier may be primary tables, while remaining tables associated with that particular identifier may be secondary tables. In some cases, there may be only one primary table associated with each particular identifier. Assigning the change type to a group of messages may depend on the change type of the messages in the group, and also on whether or not any of the messages reflect changes in a primary table. For example, if a change to a primary table is reflected in one of the messages in a group, then the change type assigned to the group of messages may be the change type associated with the change to the primary table. If no changes to any primary tables are reflected in a group of messages, then the group may be assigned an update change type regardless of the change types associated with each message in the group.

In some cases, two or more messages in a group of messages may reflect changes in the same table. Because the example implementations assign a single change type to each group based on the change types of the messages in the group, in some aspects the example implementations may assign a single change type to the two or more messages in the group. For example, if one of the two or more messages has a deletion change type, then a deletion change type is assigned to the two or more messages. If none of the two or more messages has a deletion change type, but one of the two or more messages has an entry creation type, then an entry creation type is assigned to the two or more messages. Otherwise, an update event type is assigned to the two or more messages.

In addition to extracting the pluralities of messages from the database in real time or near-real time, aspects of the present disclosure may enable the extraction of messages reflecting historical changes to the database. For example, the message parsing and forwarding system 100 may request the database to transmit a plurality of messages reflecting historical changes, and then receive and parse the received messages as described above. In some aspects, the messages reflecting historical changes may be received via a different system than the messages reflecting real time changes (such as Oracle GoldenGate). This may be particularly important when message extraction and forwarding is enabled for databases which have already been in use, resulting in entry creation, update, and deletion events occurring prior to the extraction of any messages reflecting these events. However, care must be taken not to forward outdated changes downstream. Accordingly, aspects of the present disclosure may use a number of techniques for determining whether to accept and forward messages reflecting historical changes to the database. In some examples, a timestamp for the corresponding change may be included in each message. If a message reflecting a historical change and a message reflecting a recent change to the same account or table are received, then priority may be given to the message having the more recent timestamp. In some other aspects, priority may always be given to the system through which recent or real time events are extracted over the system from which messages reflecting historical changes are received. In some other aspects, the message parsing and forwarding system 100 may maintain a list of changed entries and corresponding timestamps and may parse and forward a message reflecting a historical change to a given entry when no more recent changes to the given entry may be found in the list. In some aspects, when a message reflecting a historical change is not accepted, an acknowledgment may be sent to the database.

Figure 6:
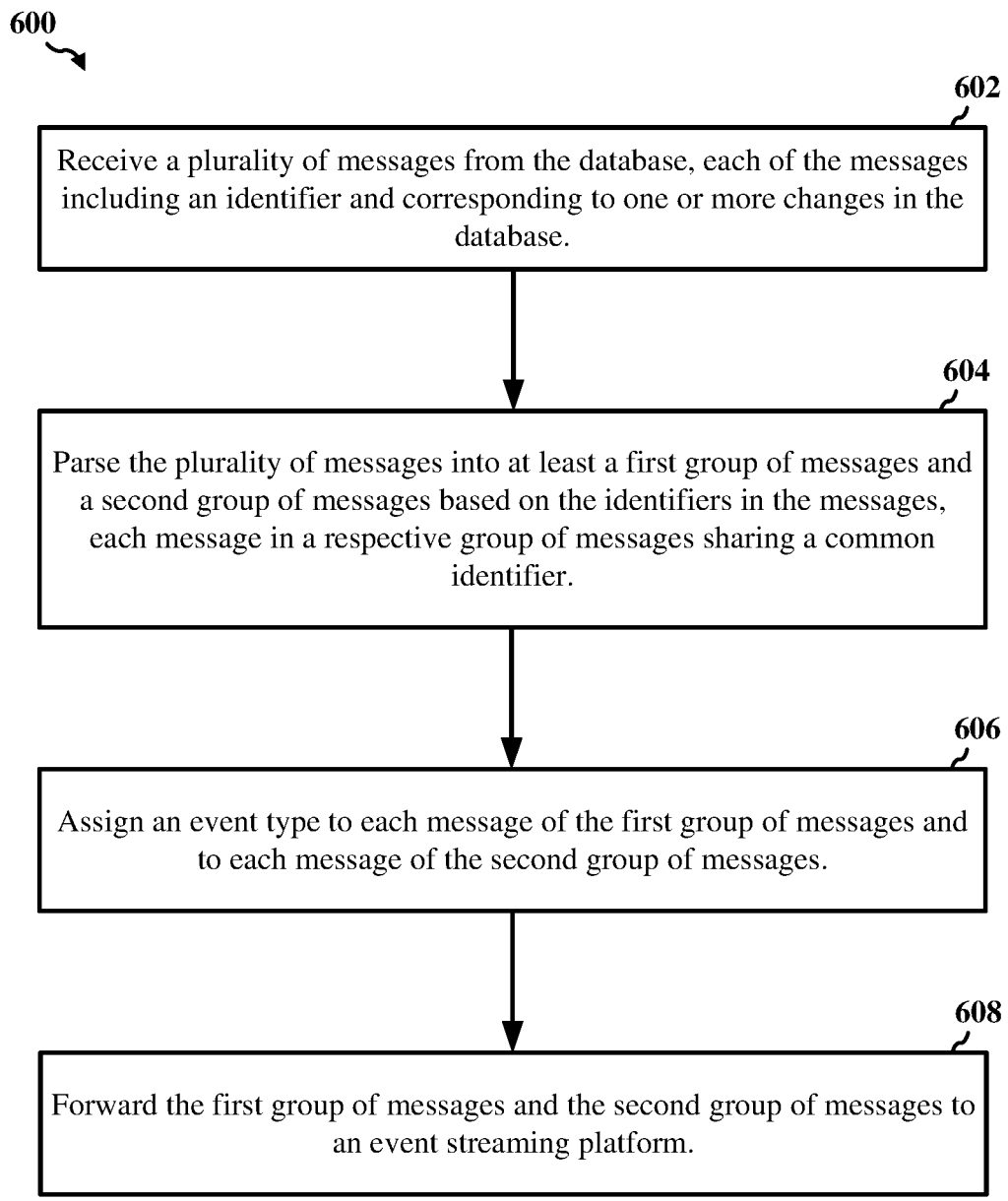
FIG. 6 shows an illustrative flow chart depicting an example operation for parsing and publishing messages corresponding to changes in a database, according to some implementations.

FIG. 6 shows an illustrative flow chart depicting an example operation 600 for parsing and publishing messages corresponding to changes in a database, according to some implementations. The example operation 600 may be performed by one or more processors of a computing device including or associated with the database, such as the message parsing and forwarding system 100 of FIG. 1. In other implementations, the example operation 600 may be performed by any suitable systems, computers, or servers.

At block 602, the message parsing and forwarding system 100 receives a plurality of messages from the database, each of the messages including an identifier and corresponding to one or more changes in the database. At block 604, the message parsing and forwarding system 100 parses the plurality of messages into at least a first group of messages and a second group of messages based on the identifiers in the messages, each message in a respective group of messages sharing a common identifier. At block 606, the message parsing and forwarding system 100 assigns an event type to each message of the first group of messages and to each message of the second group of messages. At block 608, the message parsing and forwarding system 100 forwards the first group of messages and the second group of messages to an event streaming platform.

In some implementations, the plurality of messages received in block 602 correspond to recent changes in one or more tables of the database. The common identifier may be an account number. In some aspects, the first group of messages and the second group of messages may each include messages corresponding to a respective common transaction. In some other aspects, the first group of messages and the second group of messages may each include messages corresponding to a respective common business entity.

Figure 7:
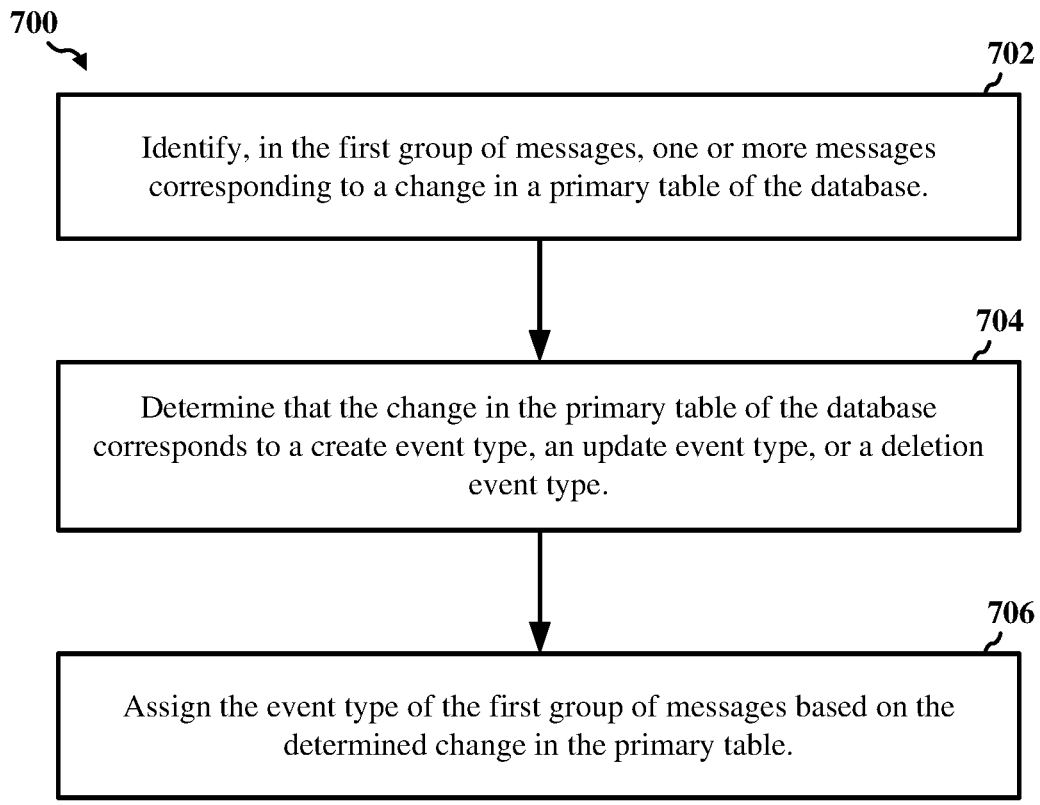
FIG. 7 shows an illustrative flow chart depicting an example operation for assigning an event type to the messages, according to some implementations.

FIG. 7 shows an illustrative flow chart depicting an example operation 700 for assigning an event type to the messages, according to some implementations. The example operation 700 may be performed by one or more processors of a computing device including or associated with the database, such as the message parsing and forwarding system 100 of FIG. 1. In other implementations, the example operation 700 may be performed by any suitable systems, computers, or servers.

In some implementations, the operation 700 may be one implementation of assigning the event type in block 606 of FIG. 6. For example, at block 702, the message parsing and forwarding system 100 identifies, in the first group of messages, one or more messages corresponding to a change in a primary table of the database. At block 704, the message parsing and forwarding system 100 determines that the change in the primary table of the database corresponds to a create event type, an update event type, or a deletion event type. At block 706, the message parsing and forwarding system 100, assigns the event type of the first group of messages based on the determined change in the primary table.

Figure 8:
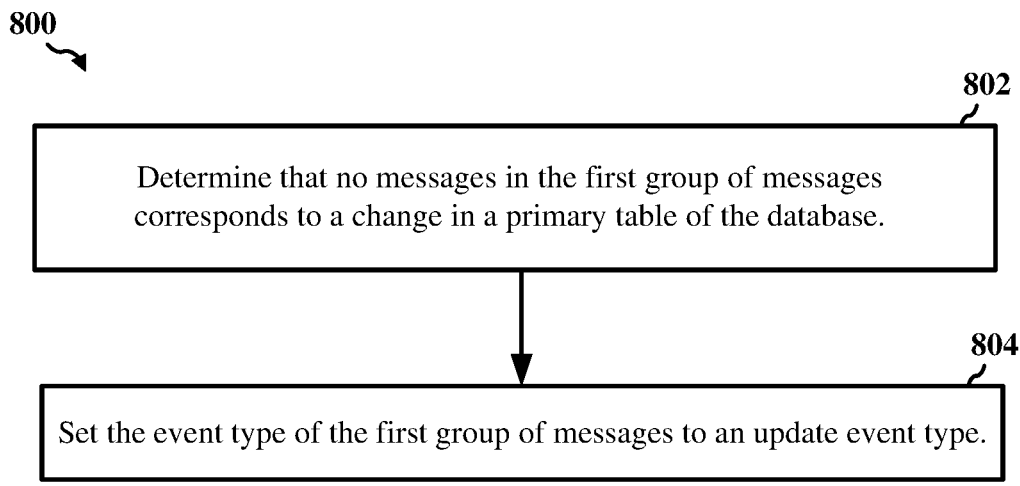
FIG. 8 shows an illustrative flow chart depicting an example operation for assigning an event type to the messages, according to other implementations.

FIG. 8 shows an illustrative flow chart depicting an example operation 800 for assigning an event type to the messages, according to other implementations. The example operation 800 may be performed by one or more processors of a computing device including or associated with the database, such as the message parsing and forwarding system 100 of FIG. 1. In other implementations, the example operation 800 may be performed by any suitable systems, computers, or servers.

In some implementations, the operation 800 may be another implementation of assigning the event type in block 606 of FIG. 6. For example, at block 802, the message parsing and forwarding system 100 determines that no messages in the first group of messages corresponds to a change in a primary table of the database. At block 804, the message parsing and forwarding system 100 sets the event type of the first group of messages to an update event type.

Figure 9:
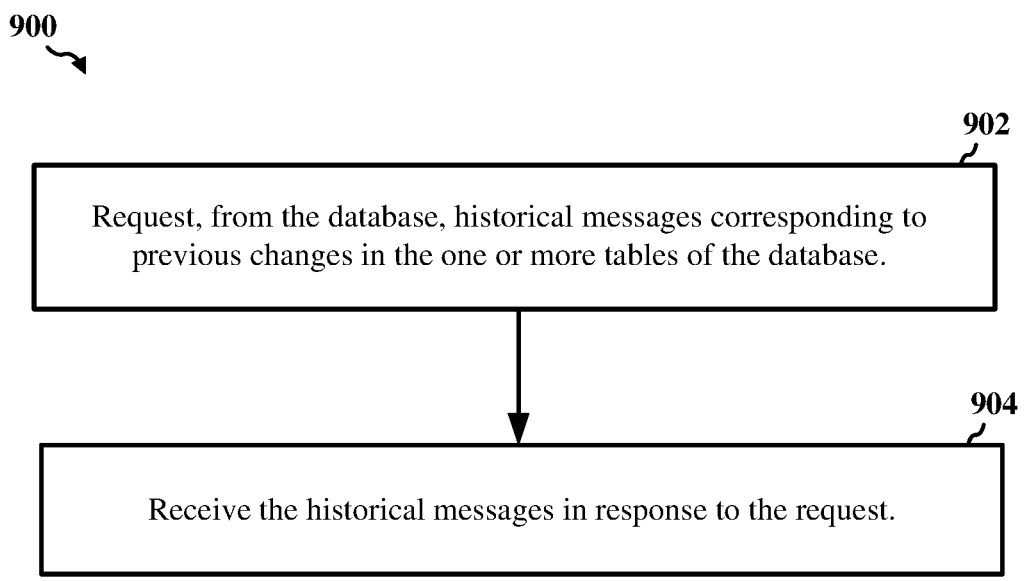
FIG. 9 shows an illustrative flow chart depicting an example operation for parsing and publishing messages corresponding to changes in a database, according to some implementations.

FIG. 9 shows an illustrative flow chart depicting an example operation 900 for parsing and publishing messages corresponding to changes in a database, according to some implementations. The example operation 900 may be performed by one or more processors of a computing device including or associated with the database, such as the message parsing and forwarding system 100 of FIG. 1. In other implementations, the example operation 900 may be performed by any suitable systems, computers, or servers.

In some implementations, the operation 900 may be performed after the operation 600 described with reference to FIG. 6. For example, at block 902, the message parsing and forwarding system 100 requests, from the database, historical messages corresponding to previous changes in the one or more tables of the database. At block 904, the message parsing and forwarding system 100 receives the historical messages in response to the request.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of parsing and publishing messages from a database, comprising:
   receiving a plurality of messages from the database, each of the messages including an identifier and corresponding to one or more changes in the database;
   requesting, from the database, historical messages corresponding to previous changes in the one or more tables of the database; and
   receiving the historical messages in response to the request;
   parsing the plurality of messages and the historical messages into at least a first group of messages and a second group of messages based on the identifiers in the messages, each message in a respective group of messages sharing a common identifier, wherein each message in the first group of messages indicates a change in one or more tables of the database;
   assigning an event type to each message of the first group of messages and to each message of the second group of messages; and
   forwarding the first group of messages and the second group of messages to an event streaming platform.

2. The method of claim 1, wherein the common identifier is aa unique identifier in each message.

3. The method of claim 1, wherein the first group and the second group of messages each include messages corresponding to a respective common event.

4. The method of claim 1, wherein the first group and the second group of messages each include messages corresponding to a respective common entity.

5. The method of claim 1, wherein the event type is one of a create event type, an update event type, or a deletion event type.

6. The method of claim 1, wherein assigning the event type includes:
   identifying, in the first group of messages, one or more messages corresponding to a change in a primary table of the database;
   determining that the change in the primary table of the database corresponds to a create event type, an update event type, or a deletion event type; and
   assigning the event type of the first group of messages based on the determined change in the primary table.

7. The method of claim 1, wherein assigning the event type includes:
   determining that no messages in the first group of messages corresponds to a change in a primary table of the database; and
   setting the event type of the first group of messages to an update event type.

8. A computing system coupled to at least one database and an event streaming platform, comprising:
   one or more processors; and
   a memory storing instructions that, when executed by the one or more processors, cause the computing system to:
      receive a plurality of messages from the database, each of the messages including an identifier and corresponding to one or more changes in the database;
      requesting, from the database, historical messages corresponding to previous changes in the one or more tables of the database; and
      receiving the historical messages in response to the request;
      parse the plurality of messages and the historical messages into at least a first group of messages and a second group of messages based on the identifiers in the messages, each message in a respective group of messages sharing a common identifier, wherein each message in the first group of messages indicates a change in one or more tables of the database;
      assign an event type to each message of the first group of messages and to each message of the second group of messages; and
      forward the first group of messages and the second group of messages to an event streaming platform.

9. The computing system of claim 8, wherein the common identifier is a unique identifier in each message.

10. The computing system of claim 8, wherein the first group and the second group of messages each include messages corresponding to a respective common event.

11. The computing system of claim 8, wherein the first group and the second group of messages each include messages corresponding to a respective common entity.

12. The computing system of claim 8, wherein the event type is one of a create event type, an update event type, or a deletion event type.

13. The computing system of claim 8, wherein execution of the instructions for assigning the event type causes the computing system to perform operations further comprising:

identify, in the first group of messages, one or more messages corresponding to a change in a primary table of the database;

determine that the change in the primary table of the database corresponds to a create event type, an update event type, or a deletion event type; and assign the event type of the first group of messages based on the determined change in the primary table.

14. The computing system of claim 8, wherein execution of the instructions for assigning the event type causes the computing system to perform operations comprising:

determine that no messages in the first group of messages corresponds to a change in a primary table of the database; and set the event type of the first group of messages to an update event type.

15. A non-transitory computer-readable storage medium storing instructions for execution by one or more processors of a computing system, wherein execution of the instructions causes the computing system to perform operations comprising:

receiving a plurality of messages from the database, each of the messages including an identifier and corresponding to one or more changes in the database;

requesting, from the database, historical messages corresponding to previous changes in the one or more tables of the database; and receiving the historical messages in response to the request;

parsing the plurality of messages and the historical messages into at least a first group of messages and a second group of messages based on the identifiers in the messages, each message in a respective group of messages sharing a common identifier, wherein each message in the first group of messages indicates a change in one or more tables of the database;

assigning an event type to each message of the first group of messages and to each message of the second group of messages; and forwarding the first group of messages and the second group of messages to an event streaming platform.

16. The non-transitory computer-readable storage medium of claim 15, wherein execution of the instructions causes the computing system to perform operations further comprising:

determining that no messages in the first group of messages corresponds to a change in a primary table of the database; and set the event type of the first group of messages to an update event type.

* * * * *